April 9, 1963 D. J. GOODFRIEND 3,084,438
DENTAL METHOD AND APPARATUS
Filed Aug. 24, 1959 4 Sheets-Sheet 4
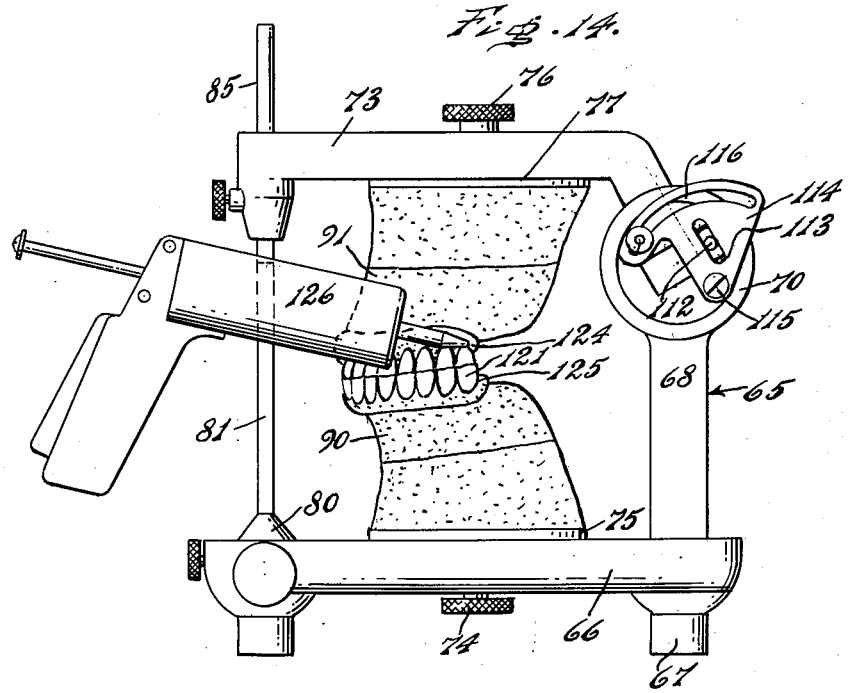
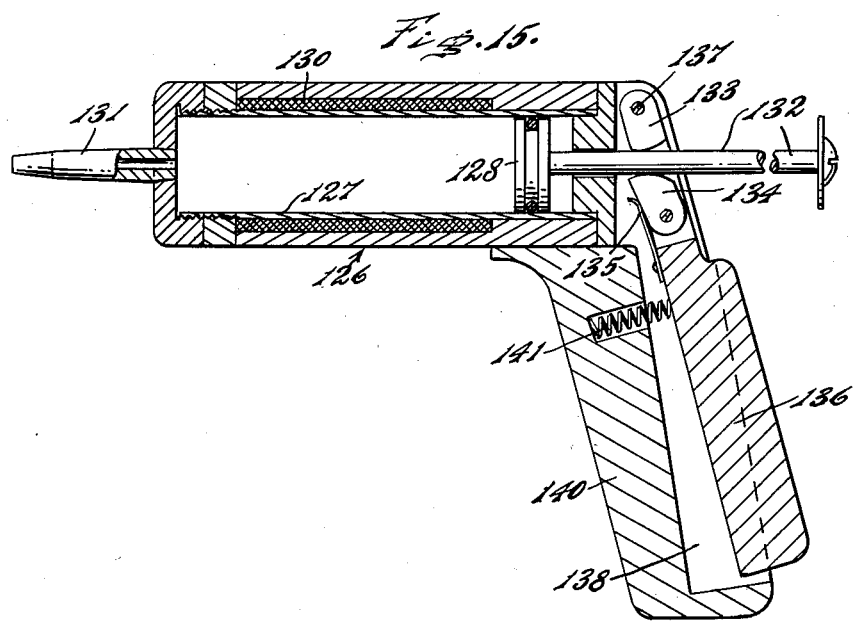
INVENTOR
David J. Goodfriend
BY
ATTORNEYS

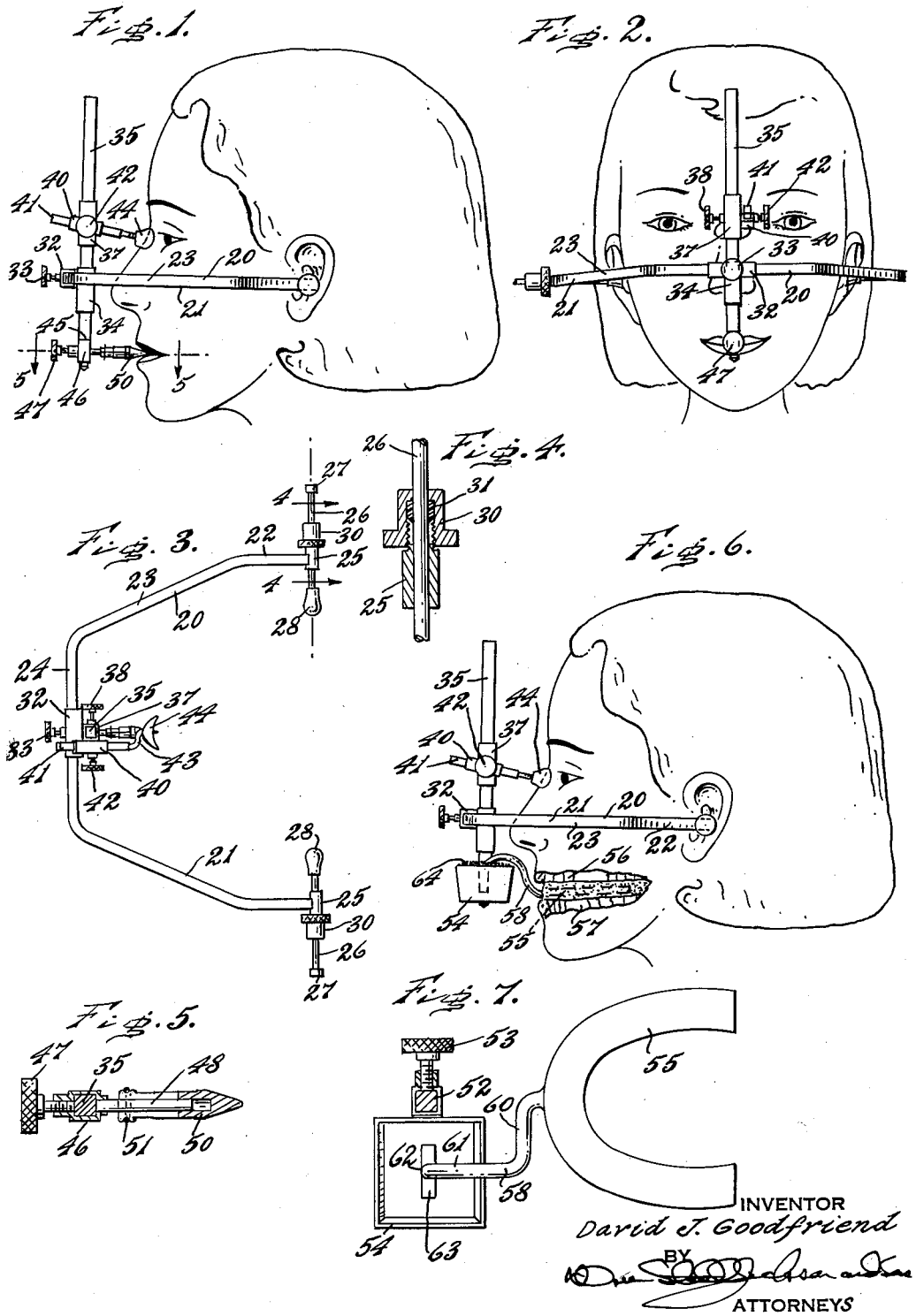

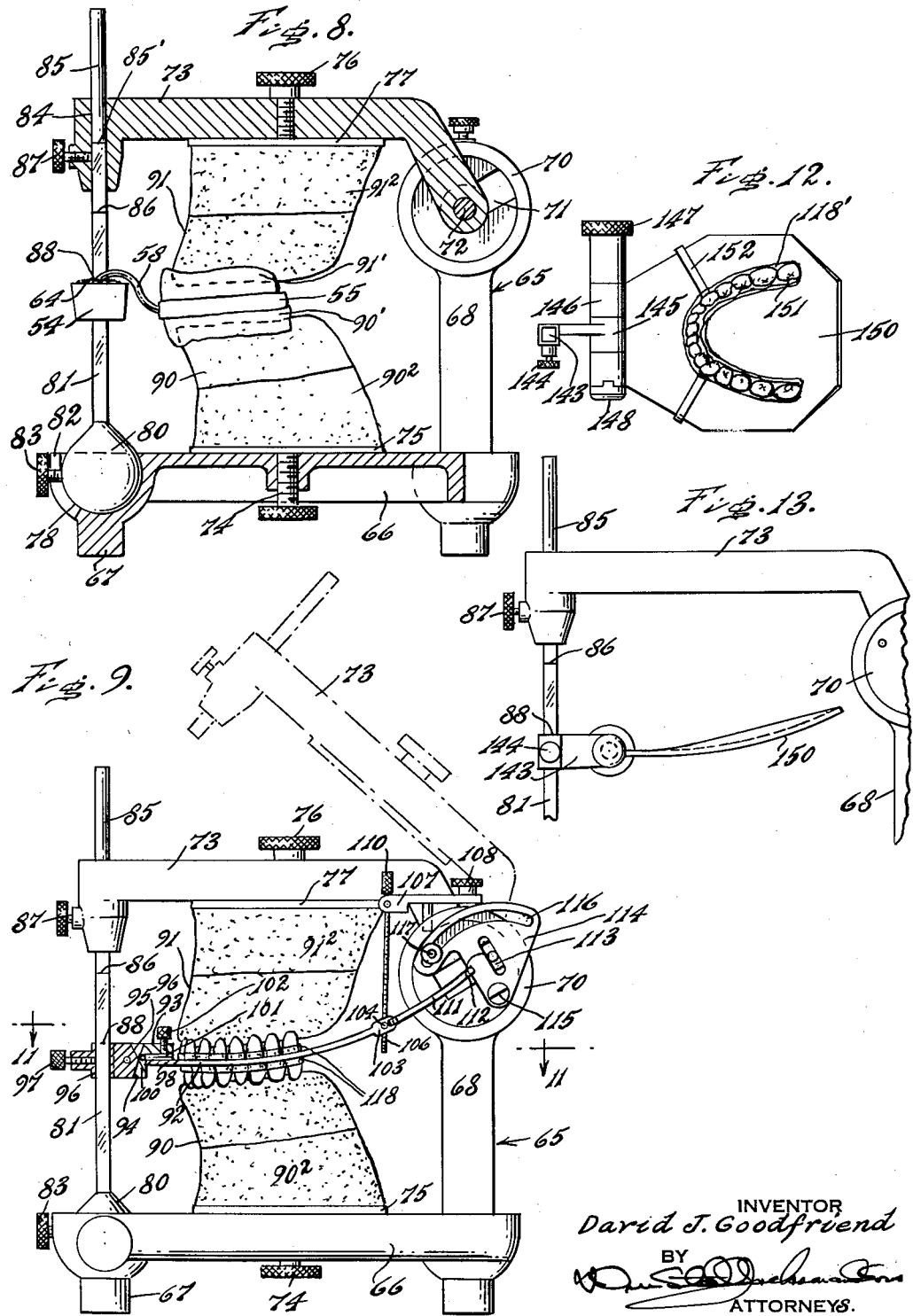

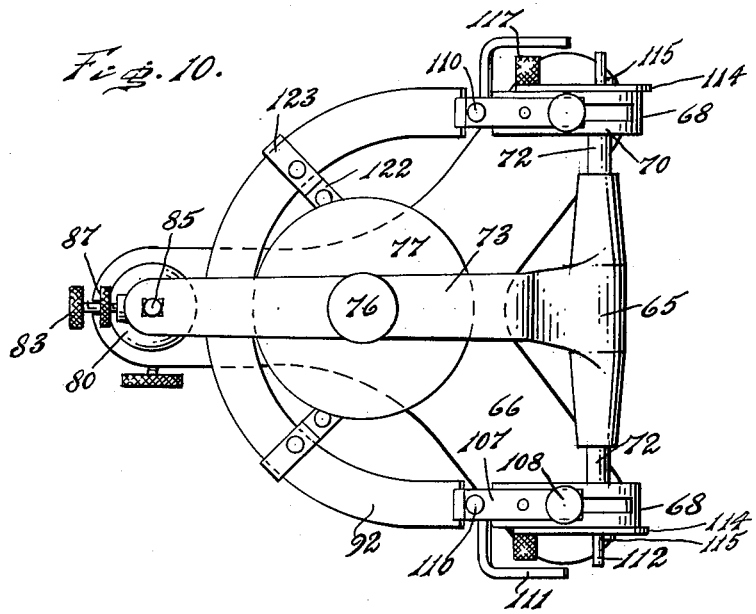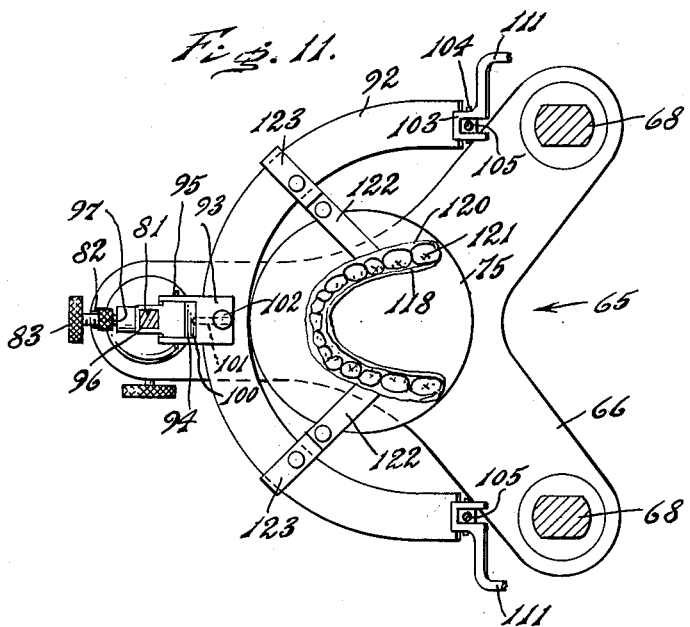

3,084,438
Patented Apr. 9, 1963

3,084,438
DENTAL METHOD AND APPARATUS
David J. Goodfriend, 600 65th Ave., Philadelphia 26, Pa.
Filed Aug. 24, 1959, Ser. No. 835,493
6 Claims. (Cl. 32—20)

The present invention relates to methods of establishing the correct dimensional jaw-tooth-temporomandibular-cranial relationships for the production of dental replacements and reconstructions such as artificial dentures, corwns, bridges, and inlays, and apparatus related thereto.

My copending application Serial No. 196,339, filed May 21, 1962, on Dental Method and Apparatus, is related as a continuation-in-part to the present subject matter.

A purpose of the invention is to permit the dentist to obtain and physically establish the correct dimensional relationships for the creation of a denture, producing an impression combination which is sturdy and capable of shipment, and which can be sent to the dental laboratory and there used to provide all the data necessary to produce a tooth replacement or tooth reconstruction in the form of a denture, or a crown, or a tooth set-up preliminary to making a denture.

A further purpose is to place a bite web in the patient's mouth and to fix the relationship of the bite web to a reproducible reference point by setting an extension from the bite web in an impression cup by plaster or the like.

A further purpose is to position a face bow properly on the face of a patient with a centering guide pin correctly placed at the mesio-incisal point, to remove the center guide pin and place an impression cup at the reference point on the face bow, to place a bite web in the mouth of the patient, with an extension into the impression cup, and to fix the proper relationship of the bite web to the impression cup by making a cast, thus assuring that the bite web and impression cup can be shipped together and can reestablish at the dental laboratory the relationships previously obtained.

A further purpose is to set up the combination of the impression cup and the bite web at a reference point on an articulator and then to mount jaw casts in the articulator against the bite web.

A further purpose is to place an occlusal guide in the articulator and to set up the teeth against the jaw casts in conformity with the occlusal guide.

A further purpose is to employ an occlusal guide which is a portion of a sphere.

A further purpose is to hinge the occlusal guide on a horizontal axis adjacent to its support.

A further purpose is to provide an occlusal guide which extends between the jaw casts and mounts the teeth.

A further purpose is to provide a U-shaped occlusal guide which surrounds the jaw casts.

A further purpose is to provide for adjustment of the position of the ends of the U-shaped occlusal guide in the vertical direction and also with respect to the articulator pivot.

A further purpose is to support a tooth mounting from the occlusal guide.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

FIGURE 1 is a side elevation of the face bow according to the invention set up in operative position with the center guide pin in proper position.

FIGURE 2 is a front elevation of FIGURE 1.
FIGURE 3 is a top plan view of the face bow omitting the patient.
FIGURE 4 is an enlarged section on the line 4—4 of FIGURE 3.
FIGURE 5 is an enlarged section on the line 5—5 of FIGURE 1.
FIGURE 6 is a view similar to FIGURE 1, but showing the impression cup, the bite web and the plaster in position, the mouth of the patient being broken away.
FIGURE 7 is a top plan view of the combination of the impression cup and the bite web before the plaster has been introduced in the cup.
FIGURE 8 is a central vertical section of the articulator set up for use in the present invention, including the impression cup, the bite web and the jaw casts.
FIGURE 9 is a side elevation of the articulator showing the preferred occlusal guide and the tooth mounting.
FIGURE 10 is a top plan view of the articulator of FIGURE 9 omitting the jaw casts.
FIGURE 11 is a section on the line 11—11 of FIGURE 9 omitting the jaw casts.
FIGURE 12 is a top plan view showing a modified form of occlusal guide and tooth mounting.
FIGURE 13 is a fragmentary side elevation similar to FIGURE 9 but showing the modified occlusal guide of FIGURE 12.
FIGURE 14 is a side elevation showing the completed tooth set-ups positioned on the jaw casts.
FIGURE 15 is a diagrammatic central axial section of the wax gun shown in FIGURE 14.

Describing in illustration but not in limitation and referring to the drawings:

Great difficulty has been encountered in the prior art in transmitting the information derived by the dentist in respect to dental reconstructions and replacements required by a patient to the dental laboratory in such form that the dental laboratory can produce a scientific and satisfactory denture or dental reconstruction. Much discomfort to patients and trouble in redoing dentures has been necessitated by the fact that there is at the present time no completely satisfactory way of providing the information derived by the dentist to the laboratory in a form that will assure the production of a satisfactory denture or dental reconstruction. It has been established that many apparently unrelated symptoms such as vertigo, deafness and ear noises are attributable to unscientifically designed dentures and dental reconstructions. Many of the methods depend upon estimating the correct positions of the dental casts and biting surfaces of the teeth by the laboratory, and where measurements are used they often fail to produce accurate results.

Dental reconstruction and replacement of teeth such as dental crowns and inlays, fixed and removable bridgework, and partial and complete artificial dentures involve alterations of the static and dynamic inter-relationships of the upper and lower jaws, the various parts of the temporomandibular joints and the biting surfaces of the lower and upper teeth. The effectiveness, comfort and acceptability of these dental reconstructions and replacements depend upon the harmony of the static and dynamic relationships of the biting surfaces of the teeth and the articular surfaces of the temporomandibular joints. In order to achieve this harmony, it is necessary to record the patient's cranio-temporomandibular-jaw relationships in a manner which will enable the models of the patient's teeth and jaws to be mounted on an articulator upon which the dental reconstructions and replacements are constructed in such a manner that they duplicate on the articulator the patient's jaw-tooth-temporomandibular joint-cranial relationships. The construction of harmonious dental reconstructions and replacements also requires that their biting surfaces be formed and located so that they meet and articulate in harmony with the static and dynamic relationships of the temporomandibular joints.

The harmony of dental reconstructions and replacements also depends upon the form of the biting surfaces of the teeth and their situation in the interjaw space of the models of the patient's jaws on an articulator on which they duplicate the patient's jaw-cranio-temporomandibular joint relationships to those parts of the articulator which represent the jaw temporomandibular joint and cranium. These procedures involve recording these relationships of the patient in a manner and by a method by which they may be shipped or transported without distortion or alteration to the technician or commercial laboratory who makes these reconstructions and replacements for the dentists and their patients.

Thus, the harmony, effectiveness and comfort of the dental reconstructions and replacements depend upon the registration and recording of the patient's tooth-jaw-temporomandibular joint-cranial relationships and their duplication on an articulator by the attachment of models or reproductions of the patient's teeth and jaws to the articulator in accordance with the registrations and records transmitted to the dental technician. The articulator consists of a mechanism in which a lower arm represents the lower jaw and an upper arm represents the upper jaw and cranium. These are joined in the back part of the articulator by means of two sliding hinge joints which represent the patient's temporomandibular joints, the axes of which are referred to as condyle points. The front of the articulator has a vertical rod which rests upon a platform. This establishes and maintains the vertical relationships of the upper and lower arm of the articulator. The vertical rod of the articulator has a centering mark or reference point which is in constant relationship to the arm and condyle points of the articulator.

The variable factors in the patient's tooth-jaw-temporomandibular joint-cranial relationships are between the condyle points and the jaws and teeth, and between the latter and the cranium. These variable relationships on the articulator are between the models of the teeth and jaws and the condyle points, the arms of the articulator and the vertical rod of the articulator. Since the vertical rod of the articulator and its center point are in constant relationships with the condyle points and the arms of the articulator, my invention utilizes this constant articulator relationship as the basis of registering the patient's jaw-tooth-temporomandibular joint-cranial relationships and duplicating them on the articulator with models of the patient's jaws and teeth.

I have found that the condyle points of an adult patient's temporomandibular joints are situated thirteen millimeters in front of the ear hole or auditory meatus on the horizontal plane of the head. This fact is important in the present invention.

My invention provides an apparatus and method for registering the patient's jaw-tooth-temporomandibular joint-cranial relationships; and for duplicating these relationships of models or reproductions of the patient's jaws and teeth on an articulator. It provides a stable, compact record of these relationships which may be readily transported and shipped to outside technicians and commercial laboratories to be used by them for attaching the models of the patient's teeth and jaws to an articulator so that they duplicate on the articulator the patient's jaw-tooth-temporomandibular joint-cranial relationships.

The patient's jaw-tooth-temporomandibular joint-cranial relationships are registered by means of a bow which extends from the ear holes to the front of the face. This bow is attached in the ear holes and on the bridge of the nose by adjustable parts. The bow has an attached vertical rod which is parallel to the so-called vertical axis of the cranium and coincides with the vertical rod of the articulator. The distance of the vertical rod of the bow to the ear hole is fixed at thirteen millimeters longer than the articulator's dimension from the vertical rod to its condyle points. Thus, the vertical rod of the bow is the same distance from the patient's condyle centers as is the vertical rod of the articulator from its condyle points.

The vertical rod of the bow has a provision to accommodate an impression cup in fixed relationship to its center point. A bite-bow is provided to be fixed in relationship to the patien's jaws and teeth. It has a projection which fits loosely into the impression cup to fix the interrelationships of the bite-bow to the impression cup. These relationships are fixed by flowing plaster of Paris into the impression cup. This fixes the relation of the teeth and jaws to the center of the vertical rod of the bow and to the patient's cranium and condyle centers. It also fixes the relationships of the patient's jaws and teeth to the center mark or reference point of the articulator's vertical rod in the same dimensional relationships as those with the center mark of the vertical rod of the bow.

The impression cup with the bite-bow fixedly connected thereto by means of the hardened plaster of Paris is then removed from the face-bow. This single unit of impression cup, plaster of Paris, and bite-bow is then sent to the commercial laboratory or dental technician where it is utilized to mount the models or reproductions of tht patient's teeth and jaws on an articulator in the same relationship to the condyle points and the arms of the articulator as the patient's jaw relationships bear to the temporomandibular joints and cranium.

The second phase of my invention consists of mounting blocks which provide for the duplication of the patient's jaw-tooth-temporomandibular joint-cranial relationships on the articulator. There are three variations of the mounting block. One consists of a platform in which three depressions accurately accommodate the three feet or supports of the articulator. The front of the platform has a vertical projection which carries a horizontal projection and vertical rod with a centering point which duplicates the center of the vertical rod of the articulator and accommodates the impression cup and bite web at that centering point. The impression cup-bite web unit is attached to the vertical rod of the mounting platform and the models or reproductions of the patient's teeth and jaws are attached to the bite-web. The articulator is placed on the mounting platform and soft plaster of Paris is flowed between the models of the patient's teeth and jaws and the articulator so that the models are thereby attached to the articulator by the hardened or set plaster of Paris. The bite-web is then detached from the models and the articulator is removed from the mounting block with the result that the models or reproductions of the patient's teeth and jaws are now attached to the articulator in the same relationship to the condyle points and arms of the articulator as those between the patient's teeth and jaws with his temporomandibular joints and cranium.

A second type of mounting block consists of a vertical rod which is mounted on the incisal platform of the articulator so that it presents a centering point which accommodates the impression cup-bite-web unit at the center point of the articulator vertical rod. From this point, the procedure of mounting the models of the patient's teeth and jaws is similar to that used in the mounting platform.

A third method consists of providing the vertical rod of the articulator with an arrangement for accommodating the impression cup-bite-web unit at its center point. The procedure from this stage would follow that of the mounting platform.

Having mounted models of reproductions of the patient's teeth and jaws on the articulator in a manner which duplicates the patient's cranio-temporomandibular joint-jaw-tooth relationships, the attainment of harmonious static and dynamic articulation of the biting surface of the teeth with the articulating surfaces of the temporomandibular joints depends upon the form and location of the biting surfaces of the artificial and reconstructed teeth in relationship to the articulating surfaces of the joints. I have found that the harmonious form of the biting surfaces of the teeth is a segment of a sphere the radius of which is the dimension from the condyle point to the point between the biting edge of the center of the two upper central incisor teeth or mesio-incisor point. I have found that the harmonious location of the biting surfaces of the teeth is situated in the inter-jaw space so that it extends from the aforementioned mesio-incisal point through or parallel to the condyle points of the temporomandibular joints. My invention provides for the harmonious formation and location of the biting surfaces of dental reconstructions and replacements by means of a template which is attached to the mounting block or vertical rod of the articulator.

This template is correlated with the impression cup-bite web and the mounting apparatus so that its forward portion coincides with the mesio-incisor point of the patient as fixed by the remaining front teeth or the mesio-incisor point marked on the bite block. With its forward portion fixed on the mounting apparatus, the right and left back portions are adjusted by set-screws to bisect the inter-ridge or inter-occlusal space between the jaws or remaining teeth of the patient's models or reproductions and to be identical with or parallel to the path of the condyle points of the articulator.

The form of the template is that of a segment of a sphere the radius of which is the dimension from the mesio-incisal point to the condyle point. I have found that the average dimension in the hundreds of patients whom I have measured during the past forty years is four inches plus or minus one half inch. These variants are minus for women and plus for broad headed males. Thus, there are three alternate templates provided the radii of which are three and one-half, four and four and one-half inches.

A further provision of my invention consists of impressions or moulds of the biting surfaces of artificial teeth and tooth forms which either constitute the templates or are arranged to contact the surfaces of the templates. These are impressions of ideal set-ups of artificial teeth or tooth forms into which the artificial teeth and tooth forms are placed and waxed to the shellac plate forms of edentulous jaws or to the tooth preparations of teeth to be reconstructed. As a result of this provision of my invention, the set-up of artificial teeth and occlusal forms of teeth to be reconstructed is automated and guided by these templates to ideal harmonious form, location and articulation with the patient's temporomandibular jaw and cranial relationships.

My invention also provides a novel method for adjusting the interrelationship of the lower jaw and teeth with the upper jaw and teeth. This consists of parts which are attached to the temporomandibular joint portions of the articulator. These hold the condyle axes of the articulator in place by means of set screws, and provide for alterations of the situation of the condyle axes along the sliding parts of the articulator's condyle paths.

I illustrate in FIGURES 1 to 7 a face bow 20 which is mounted on the head of the patient as shown. The bow comprises a bow body 21 generally of U-shape, which has straight side portions 22, diagonal connecting portions 23 and a straight front portion 24 suitably bent from square rod. At the inner end there are bearings 25 which mount ear pins 26 sliding in the bearings and having external heads 27 and internal suitably resilient ear plugs 28, conveniently of a material which will stand sterilizing such as rubber. The ear pins 26 are surrounded by nuts 30 threaded on the outer ends of the bearings and tightening friction packing 31 so that the ear pins can be pushed in until the ear plugs 28 fit firmly but comfortably in the external auditory meatus or ear hole, and the pins due to the friction of the packing 31 will stay in the position set, thus determining the correct relationship of the inner ends of the face bow to the head of the patient.

It will be evident that since the external auditory meatus is behind the condyle point, allowance is made for this fact in designing the face bow, so that the distance from the ear pins of the face bow to the center of the vertical rod should be approximately 13 millimeters longer than similar dimensions on the articulator.

The front portion 24 of the face bow is surrounded by a suitably square bow slider 32 which is moved laterally until the proper central relationship of the center guide pin is established as later described, and then tightened and set in the correct position by tightening set screw 33 on the bow slider which works on the bow body. The slider 32 carries rigidly mounted thereon a suitably square tube 34 which receives and is rigidly fastened to a vertical rod 35 of square cross section at a height mentioned below. When the face bow is described as being horizontal and the rod 35 is described as being vertical, it will be understood that the center of the bow is at the horizontal axis of the cranium and the vertical rod is parallel to the vertical axis of the cranium, but that the patient may not hold his head in a manner so that these axes are truly horizontal and vertical. The vertical rod 35 has above the bow body a suitably square vertical slider 37 riding on the rod 35 and positioned at a particular position on the rod by set screw 38 on the slider. The vertical slider 37 rigidly mounts a clamp 40 of square cross section which provides for front and back adjustment and is slightly inclined downwardly toward the bridge of the nose. A nose support rod 41 of square cross section extends through the clamp 40 and is held in proper adjustment position by set screw 42 on the clamp. The rod 41 being positioned somewhat to the side of the center of vertical rod 35 is bent at 43 to bring the nose bridge engaging piece 44, suitably of rubber, into central position at the bridge of the patient's nose.

At its lower end the vertical rod 35 has a first reference point 45 which may simply be a mark to which adjustable structure on the bottom of the bar 35 must be positioned, but in the preferred embodiment will be a shoulder 45 caused by reducing the square cross section of the bar below the shoulder 45. A square clamp 46 is removably attached on the bottom of the vertical rod 35 until its upper end is in line with the first reference point 45. The clamp is held in position by set screw 47 on the clamp. The clamp rigidly supports pin 48 which extends toward the mouth of the patient and has a removable pointed centering guide tip 50 suitably of rubber or other convenient material which can be sterilized. The tip is desirably held in a predetermined position on the pin 48 by a ring spring 51.

The position of the pin 48 below the face bow is such that the distance parallel to the vertical axis of the cranium between the center of the pin 48, and the horizontal axis of the face bow is equal to the distance later to be described between the lower edge of the upper arm of the articulator and the center point of the vertical rod of the articulator.

After the device has been properly set up on the head of the patient, the clamp 46 and the center guide pin are removed, and a square tubular clamp 52 is fitted on the lower end of the vertical rod 35 and adjusted until its upper end coincides with the first referenece point 45 as seen in FIGURE 6. The clamp 52 is held on by set screw 53 on the clamp shown in FIGURE 7. Positioned on the clamp and extending out from it is an upwardly open impression cup 54 adapted to receive impression plaster as later explained.

A bite web 55 conforming to the shape of the teeth, and consisting of a U-shaped piece of metallic sheet with a deposit of impression wax on each face, is placed correctly in the patient's mouth as shown in FIGURE 6. If the patient has teeth in both jaws, the bite web is placed between the teeth, as in the case of making a partial denture. If, however, the patient lacks teeth in either or both jaws, a bite block or bite blocks as well known will be placed on the jaw or jaws. Therefore, upper teeth or an upper bite block is shown at 56, and lower teeth or a lower bite block is shown at 57, engaging above and below the bite web.

The bite web has an extension 58 which protrudes from the mouth at the center and has a bend 60 which carries it over to the center of the impression cup. At the forward end the extension 58 has a gooseneck portion 61 which extends down and carries at its lower end a second reference point 62 which desirably carries on either side a cross bar 63 which will be imbedded in the plaster and will position the bite web rigidly in all directions with respect to the suitably pyramid shaped cavity of the impression cup. Even if the plaster 64 after placed in the impression cup should become detached, the plaster block can again be placed in the impression cup to its correct position.

After the combination of the impression cup, the bite web and the plaster has been established, the bite web combination is forwarded to the laboratory and there assembled in an articulator which reproduces the critical data of the patient's face and mouth.

In FIGURE 8 I show an articulator 65 having a base 66 and suitably three legs 67 which position the base firmly and horizontally on a flat surface. At the pivot end of the articulator uprights 68 extend upward and carry pivot head 70 similar to those on existing articulators which have pivot slots 71 which receive pivot pin 72 at opposite ends of the pivot of the upper articulator arm 73 which positions the upper jaw cast. The pivot pins 72 tend to remain central in the pivot heads but can be adjusted in slots 71 as well known in the art. A screw 74 on the base mounts a lower platform 75 which supports and adheres to the lower jaw cast and a screw 76 through the arm 73 secures on the lower surface of the arm an upper platform 77 which adheres to and supports the upper jaw cast.

A socket 78 is positioned on the side of the base remote from the uprights 68 and in the socket is placed a ball 80 which carries an upright 81 of square cross section corresponding to the lower end of a vertical rod 85.

The adjustability by the ball 80 is unnecessary for the purpose of the present invention, and the upright 81 will desirably be set in a permanent vertical position.

There is a slot 82 in the socket in which a set screw 83, threaded into the ball, passes to lock the ball in position to hold the upright 81 vertical.

Directly above the upright 81 there is a vertical opening 84 through the end of the arm 73 remote from the pivot. The opening 84 is square near the bottom and round near the top. Through this opening 84 passes the rod 85 of contour similar to the opening which at its lower end 86 engages to top of the upright 81. The rod 85 is held by set screw 87 in proper position to make the arm 73 horizontal.

A reference mark 88 on the upright 81 has the same position with respect to the critical dimensions of the articulator as the first reference mark 45 has with respect to the corresponding condyle centers, the horizontal transverse plane of the patient's cranium and the mesio-incisal point of the patient.

Thus it will be evident that when the articulator is set up with the bite web mounted on the upright 81 against the reference line 88 and the bite web positioned in the plaster, the vertical distance from point 85' at the bottom of the arm of the articulator to the center of the articulator is equal to the distance previously described between the central horizontal plane of the bow 20 and the center of the pin 48.

Casts of the patient's jaw and/or teeth and also suitably bite blocks if required have been made by the dentist. The upper cast 91 suitably with the upper bite block 91' are attached to the bite web, and then secured to a platform 77 on the arm of the articulator by plaster of Paris $91^2$. The lower cast 90 and the lower bite block 90' if any are secured to the bite web and fastened to the lower platform 75 by plaster of Paris $90^2$.

When the plaster of Paris has hardened, the articulator is opened, as suggested by the dot-and-dash lines in FIGURE 9, and the set screw 53 is loosened and the impression cup and bite web, as well as the bite blocks if any, are removed from the articulator. The contours of the jaw surfaces have been correctly established, and the laboratory can if desired insert teeth on these jaw surface contours by inspection according to previous practice, but with much greater assurance that the biting surfaces are correctly placed. It is however preferable in accordance with the present invention to use an occlusal guide as shown in FIGURES 9 to 11 or in FIGURES 12 and 13, in the preferred embodiment a U-shaped sheet 92. It is of spherical form having a radius which corresponds to the distance between the condyle centers on the one hand and the mesio-incisal point of the patient and articulator on the other hand. The spherical plate 92 is mounted at the base of the U on a bracket 93. The opposite end of the bracket forms one-half of a hinge 94 pivoted at 95 on a suitable pin, and the other half of the hinge is mounted on square tubular clamp 96 which is positioned at reference point 88 on upright 81 by set screw 97. In order to permit creating adequate friction in the hinge so that it will maintain its position except when firmly pressed, an opening 98 extends through the hinge portion 93 toward adjoining hinge surfaces 100, which are generally of wedge form, and an adjustable friction pin 101 extends through the opening 98 to a position adjoining the apexes of the wedge surfaces and is held in properly adjusted position by set screw 102.

In the preferred embodiment, the inner end of the U of the occlusal guide has fastened thereon at each end a yoke 103 (FIGURE 11) which pivotally mounts at 104 on a transverse axis a nut 105 through which threads a screw 106 which passes through an opening in a clip 107 mounted by a set screw 108 on the top of the pivot head 70. The screw 106 has a head 110 at the top which permits adjustment of the vertical position of the ends of the occlusal guide. The yokes 103 have indicators 111 which extend in prolongation of the curvature of the sphere to a position in line with and beyond the reduced diameter extensions 112 on the pivot pins 72. The pin extensions 112 are carried through openings in the ends of the pivot heads and also are carried through forwardly and rearwardly extending slots 113 on segments 114 which are pivoted below and behind the centers of the pivot heads on screws 115 and which have concentric with the center 115, segmental slots 116 which permit adjustment of the segments by set screws 117.

Suitably metallic or plastic spring tooth mounting 118 is shown in FIGURES 9 and 11 having tooth sockets 120 which receive artificial teeth 121. When reference is made herein to artificial teeth it is intended also to include tooth forms. The teeth protrude beyond the tooth sockets of the tooth mounting and are in position so that their bases engage against the jaw casts 90 or 91 as the case may be.

In the form shown the tooth mounting 118 receives two sets of teeth biting surface to biting surface. The tooth mounting 118 is of course chosen to a size which will fit the jaw casts. The tooth mounting has at its sides metallic clips 122 which have at the ends adjoining the occlusal guide spring jaws 123 which are positioned on opposite sides of the occlusal guide (above and below) and extend radially toward the space inside the occlusal guide.

It is then possible, with the teeth in position in the tooth mounting and the tooth mounting positioned between the jaw casts, to inject soft wax at 124 around the upper teeth and against the upper jaw cast and at 125 around the lower teeth and against the lower jaw cast, thus producing wax test mountings which can be returned to the dentist for trial fitting of the teeth.

Wax is best introduced by an extrusion gun 126 best seen in FIGURE 15 which has a cylinder 127 fitted with a piston 128 and surrounded by an electric resistance heater 130. A nozzle 131 extends from the front of the cylinder. The piston is advanced by a piston rod 132 which is gripped on the forward stroke between a fixed gripping jaw 133 and a swingable gripping jaw 134 urged to gripping position by a leaf spring 135. The gripping jaws are on a movable handle 136 pivoted at 137 and working in a recess 138 of a pistol grip 140. The operating handle 136 is urged toward retracted position by a helical compression spring 141.

In operation, in proportioning a denture or other corrective dental appliance according to the present invention, the patient is fitted with the face bow as shown in FIGURES 1 to 7 inclusive, moving the ear pins and plugs in until the plugs are equally advanced and fit snugly but comfortably in the external auditory meatus. Releasing set screw 33, the clamp is slid laterally until the vertical rod 35 is correctly placed in the vertical medial line of the face directly in front of the center of the mouth, with due allowance for the fact that the two sides of the face may not be symmetrical. The clamp 46 is then placed at the lower end of the vertical rod 35 against reference point 45 and held in place by tightening set screw 47. The body of the face bow is now adjusted by pivoting around the ear pins until it lies in the horizontal transverse plane of the patient's cranium. Then by manipulating set screws 38 and 42 the nosepiece is brought to bear on the bridge of the nose and held in that position so that it supports the body of the face bow. The body of the face bow is now in the horizontal transverse plane of the patient's cranium, and the center guide pin 48 and the plug 50 are at the mesio-incisal point. It has been found that in adult patients the distance between the horizontal transverse plane of the patient's cranium and the mesio-incisal point is approximately the same about 50 millimeters. If after these adjustments have been made, any further correction is required, the operation should be repeated making minor corrections until a correct adjustment has been accomplished as shown in FIGURES 1 and 2.

Now the dentist by releasing set screw 47 removes the mesio-incisal guide assembly and places on the bottom of the vertical rod instead at the first reference point 45 impression cup 54 which is empty and ready to receive a cast. A properly proportioned bite web 55 having relatively soft wax on the upper and lower surfaces is then placed between the patient's teeth properly centered and positioned, if the patient has teeth, or between bite blocks properly placed in the patient's mouth if the patient is without teeth. The extension 58 of the bite web leads over and into the impression cup. The patient is then caused to bite firmly against the bite web, displacing the wax and creating the desired impressions which will indicate the contour of teeth, if the patient has teeth, or the position where it is desired to locate arificial teeth in a correctly formed denture.

This also establishes the correct vertical, horizontal and angular position of the wax surfaces on the bite web with respect to the condyle centers, with respect to the horizontal transverse plane of the cranium and with respect to the mesio-incisal point. All of these features are established on the face bow and will be reproduced later in the articulator.

The dentist then places impression plaster or the like at 64 in the impression cup around the second reference point 62 of the bite web and allows the plaster to harden, thus firmly uniting the bite web to the impression cup at a position that is accurately determined. It will be noted that the fact that the bite web is located relatively high or relatively low, with respect to the impression cup, or that the reference point 62 is relatively far forward or relatively far back in the impression cup, or that the reference point 62 is located to one side or the other in the impression cup, or that the bite web is positioned angularly in one direction or another, all of which are characteristics individual to the cranium, face and mouth of the particular patient, are all reflected by the way in which the bite web is held by the plaster in respect to the impression cup.

The denist then releases set screw 53 and removes the impression cup and bite web together from the patient's mouth and the face bow, along with the bite blocks, if any. The face bow has then served its purpose and is removed from the patient's face.

If the dentist does his own laboratory work, the combination of the bite web and impression cup held together by the plaster will be used in the dentist's laboratory, but if he has mechanical work done by an outside laboratory, the combination of the bite web, impression cup and plaster will be shipped to the laboratory. It will be noted that this is a relatively small unit which can be safely packed and will stand rough treatment of the package.

When it arrives at the laboratory, either the laboratory of the dentist or an outside laboratory, an articulator 65 is employed which has the same condyle radius as the face bow, and which is adjusted for the same critical reference dimensions in other respects. Actually in practice it has been found that one articulator will serve for almost all cases.

With the articulator opened, the clamp 52 is slid over the upright 81 and adjusted to the reference point 88 on the articulator which corresponds to the first reference point on the face bow.

The bite web 55 extends into the interior of the articulator positioned in exactly the same relation to the critical dimensions on the articulator that it bore to the critical dimensions on the patient, and held in place by the plaster cast 64 in the impression cup.

The laboratory then proceeds to attach the upper and lower jaw casts which have been made as well known in the art to the upper and lower platforms of the articulator and/or the bite blocks, by reference to the previously positioned bite web. Thus the bite web acts as a controlling device to correctly position the bite blocks and/or jaw casts, for the subsequent operation of fitting the teeth. The operator can now open the articulator, and the impression cup and bite web are removed.

With the articulator open, the occlusal guide 92 is then placed in position against reference point 88 and held by tightening set screw 97 (FIGURE 9). Screws 106 are threaded through the nuts 105 at the ends of the occlusal guide, the indexes 111 extending out until they are in prolongation of the axis of the articulator. Any desired adjustment to place the indexes correctly is made by tightening or loosening screws 106, the occlusal guide swinging around its hinge pin 95, with slight stiffness due to the adjustment of pin 93. If desired, the segment will be adjusted by loosening and then tightening set screws 117, in case there is evidence in the jaw casts of the fact that the axis should not be exactly symmetrical.

With the articulator open, a tooth mounting 118 is placed in position in the occlusal guide, being supported by the spring clips 122. The teeth in the tooth guide, which is of spring material, suitably thin metal or plastic, are adjusted until they fit the bottom jaw cast, and then the corresponding upper teeth are adjusted until they fit the upper jaw cast when the articulator is closed. If the teeth are not of the proper size, substitutes are inserted and the process of adjustment goes on until the teeth in size and position accurately fit the jaw casts.

When the correct adjustments have been made, the laboratory then injects soft wax between each jaw cast and the teeth and finally produces two waxed tooth setups 124 and 125.

The waxed tooth set-ups are removed from the tooth mounting 118 when the articulator is open and then the tooth mounting 118 is removed from the articulator, and the waxed tooth set-ups can be placed back in the articulator to test the correctness of other matching as shown in FIGURE 14.

The tooth set-ups make correct allowance for the patient's maxillary, cranial and temporomandibular relations and for a harmonious occlusal plane.

In some cases, instead of using a remote occlusal guide which is located at a position outside the intermaxillary space, it is preferable to extend the occlusal guide into the intermaxillary space.

An occlusal guide of this character is shown in FIGURES 12 and 13. In this case a square tubular clamp 143 is placed on the upright 81 at the reference point 88 and held in place by set screw 144.

The clamp 143 supports a hinge element 145 and co-operating hinge elements 146 which, together with a hinge element 145, receiving hinge bolt 147 which threads into a hinge nut 148 so that the hinge can be tightened and held in any position, the axis of the hinge being horizontal.

The hinge elements 146 support a spherical occlusal guide 150, the continuation of whose curve is in line with the pivot axis of the arm of the articulator.

A spring tooth mounting 118' suitably of spring sheet metal or plastic, receives in this case a series of upper teeth 151 whose incisal surfaces rest against the occlusal guide 150, the surfaces remote therefrom resting against the jaw cast when the articulator is closed. Spring clips 152 on the tooth mounting hold it to the occlusal guide. When teeth of proper size and form have been fitted as indicated by proper conformity to the jaw casts, the teeth are suitably waxed into a tooth set-up as shown in FIGURE 14. Similar technique is used by placing a tooth mounting beneath the occlusal guide in fitting the teeth to the lower jaw cast.

In view of my invention and disclosure, variations and modifications to meet individual whim or particular need will doubtless become evident to others skilled in the art, to obtain all or part of the benefits of my invention without copying the method and apparatus shown, and I, therefore, claim all such insofar as they fall within the reasonable spirit and scope of my claims.

Having thus described my invention what I claim as new and desire to secure by Letters Patent is:

1. A dental face bow having a bow-like body which extends from the external auditory meatus around the front of the face, having at the ends of the body and secured thereto centering devices which fit into the external auditory meatus, having a vertical front rod, means connecting to the vertical front rod and the body for laterally adjusting and laterally fixing the position of the vertical front rod on the body centrally to the bridge of the nose, a rod which extends toward the face from the vertical front rod and engages the bridge of the nose, means connected to the vertical front rod and to the rod which engages the bridge of the nose for adjustably connecting the rod which engages the bridge of the nose with the vertical front rod, an impression cup removably connected with a lower part of the vertical front rod in a position determined by a medial incisal marker, and a bite web having an extension into the impression cup and adapted to be held by plaster in the impression cup.

2. A dental face bow of claim 1, in which the vertical front rod is rectangular and said connecting means therewith are rectangular, so that the vertical front rod maintains the rod which engages the bridge of the nose and also the impression cup and the medial incisal marker in a predetermined angle position.

3. In a dental face bow, a body extending from the external auditory meatus around the front of the face, centering devices at the ends of the face bow adapted to extend into the external auditory meatus, an impression cup mounted on the face bow at a position opposite the mouth and a bite web extending into the impression cup and adapted to be held therein by plaster.

4. A dental face bow to aid in the making of a dental impression for use in an articulator adapted to support the dental impression in substantially the same relationship to the articulator pivot axis as the impression was produced in the face bow relative to the condyle centers in a patient's jaw, said face bow including a body extending from the external auditory meatus around the front of the face, centering devices at the ends of the face bow for extending into the external auditory meatus and having an axis a distance rearward on the patient which is equal to the distance from the condyle centers to the ear holes of an average patient, an impression cup mounted on the face bow at a position opposite the mouth, and a bite web having an extension into the impression cup and adapted to be held thereon by plaster at a distance from the condyle centers of the patient, the latter said distance being substantially equal to a comparable distance of the impression from the articulator pivot axis when the impression is supported in substantially the same relationship to the articulator pivot axis as the impression was taken by aid of the face bow.

5. In a dental face bow, a body extending from the external auditory meatus around the front of the face, centering devices adapted to engage in the external auditory meatus, a vertical front rod, laterally adjustable means adjustably connecting the vertical front rod with the face bow, an impression cup removably connected to the lower end of the vertical front rod at a predetermined position beneath the body, a nose bridge engaging rod at an upper position extending toward the face and an adjustable connection for the nose bridge engaging rod to the vertical front rod.

6. A face bow of claim 5, in combination with a bite web extending into the impression cup and adapted to be secured therein by means of plaster.

References Cited in the file of this patent

UNITED STATES PATENTS

| | | |
|---|---|---|
| 268,614 | Brown | Dec. 5, 1882 |
| 1,033,562 | Eltner | July 23, 1912 |
| 1,550,339 | Branson et al. | Aug. 18, 1925 |
| 1,589,802 | Gould | June 22, 1926 |
| 1,668,845 | Hanau | May 8, 1928 |
| 1,674,088 | Bodine | June 19, 1928 |
| 2,168,530 | Kyprie | Aug. 8, 1939 |
| 2,554,277 | Taylor | May 22, 1951 |
| 2,673,397 | McPhee | Mar. 30, 1954 |
| 2,818,646 | Stuart | Jan. 7, 1958 |